INVENTOR.
ENDRE A. MAYER

United States Patent Office 3,444,878
Patented May 20, 1969

3,444,878
FLUID CONTROL DEVICE
Endre A. Mayer, Birmingham, Mich., assignor to The Bendix Corporation, a corporation of Delaware
Filed Apr. 4, 1966, Ser. No. 539,761
Int. Cl. F15c 1/08
U.S. Cl. 137—81.5                                    11 Claims

ABSTRACT OF THE DISCLOSURE

The pressure amplifier having a vortex chamber with a centrally located outlet hole in combination with a probe axially displaced downstream of the outlet hole connected to a source of counterflow fluid.

---

This invention pertains to a fluid control device and more particularly to a fluid vortex device wherein a supply pressure is subjected to a control pressure which causes the supply pressure to experience a vortical motion resulting in an output that is reduced in proportion to the vortical motion.

Fluid vortex devices are generally known in the art. They comprise a cylindrical chamber, an inlet for introducing supply fluid to the chamber, an axially disposed outlet for discharge of fluid from the chamber and a control port for introducing control fluid tangentially into the chamber to impart rotational velocity or vorticity to the fluid flowing through the chamber. Introduction of the control fluid, which occurs when control pressure is greater than supply pressure, imparts a rotational velocity to the fluid in the chamber which produces a reduction in the amount of fluid emerging from the outlet and a reduction in output pressure. The amount of fluid emerging and output pressure decrease as the rotational velocity is increased.

In the preferred embodiment described below, there is an output pickup tube which is axially displaced from the center of the vortex and receives an output flow from the vortex. The pressure in the output tube is lower than the pressure in the center of the vortex, and the chamber surrounding the outlet tube is vented through a valve to atmosphere or other pressure less than supply pressure. The following objects will refer to this type of vortex device.

It is an object of this invention to provide in a vortex device as described above, an area of extremely high gain in a low control input area thereby making the device very suitable as a rotational rate sensor.

It is an object to provide in such a fluid control device reduced noise so that the device has higher sensitivity.

It is an object of this invention to accomplish the high gain and reduced noise by introducing a fluid flow in the output tube which is counter to the output flow in the tube.

It is an object of this invention to connect, by means of a fluid connection, the center of the vortex to the output tube, thereby establishing substantially the same pressure in the output tube as in the center of the vortex thereby providing the above-mentioned counterflow from an internal pressure source.

It is an object of this invention to provide the above-mentioned counterflow by connecting an external pressure source to the output tube.

It is an object of this invention to provide valves in the output chamber vent, the counterflow line connecting the center of the vortex and the output pickup tube, and the output line which is connected to the counterflow line to obtain maximum performance from the fluid device.

These and other objects will become more apparent when a preferred embodiment is described in connection with the drawings in which.

Figure 1:
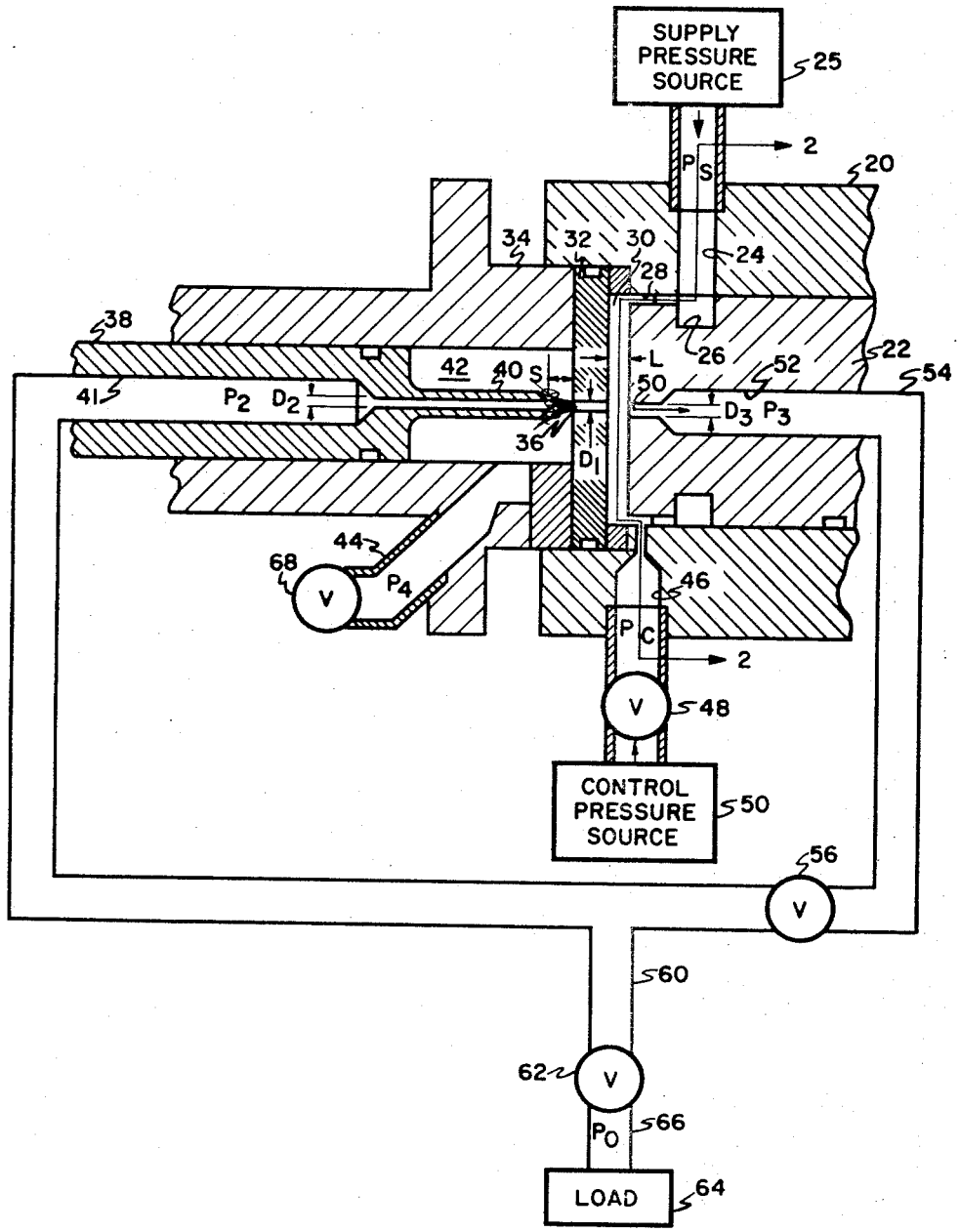
FIGURE 1 is a partially sectioned schematic view of a preferred embodiment of this invention taken at 1—1 of FIGURE 2.

Embodiment of FIGURE 1

In FIGURE 1 is shown a fluid vortex device having an outer tubular member 20 housing an inner cylinder 22 and having an input passage 24 which is connected to a supply pressure source 25 for supplying a pressure $P_S$.

Passage 24 is connected to annular groove 26 which carries the supply flow and is in communication with chamber 30 through annulus 28.

Chamber 30 is defined by the end of cylinder 22 and disc 32 with disc 32 being supported in tubular housing 20 by a second tubular member 34. Disc 32 has an opening 36 centrally thereof.

A cylinder 38 is positioned centrally of tubular member 34 and has an annular flange 40 which is in connection with a central opening 41 in member 38 to provide an output pickup tube. A chamber 42 is provided around tube 40 and a vent 44 vents chamber 42 to atmosphere.

Also formed in tubular member 20 is control port 46 which is connected through a valve 48 to a control pressure source 50 which supplies control pressure $P_C$. There may be additional ports 46 supplied with control pressure $P_C$.

Supply pressure $P_S$ causes a flow which passes through tube 24, annuli 26, 28, chamber 30, opening 36, to output tube 40. The flow from annulus 26 to opening 36 is radial when there is no control flow from port 46. A control flow is developed when the control pressure $P_C$ in port 46 exceeds the supply pressure $P_S$ in port 24 causing a "swirl" or vortical flow of air in annulus 28 and chamber 30, which develops a back pressure reducing the pressure at the center of the vortex which would be in the center of chamber 30.

The output flow from opening 36 to output tube 40 is a straight flow when there is no control flow from port 46, and fans out or becomes conical as a control flow occurs from port 46. The amount of fanning, or angle of the cone, increases as the vortical flow, due to increasing control pressure from port 46, increases. The higher the vortical flow, the less flow will be directed to output pickup tube 40 and therefore the lower the pressure in pickup tube 40.

Figure 2:
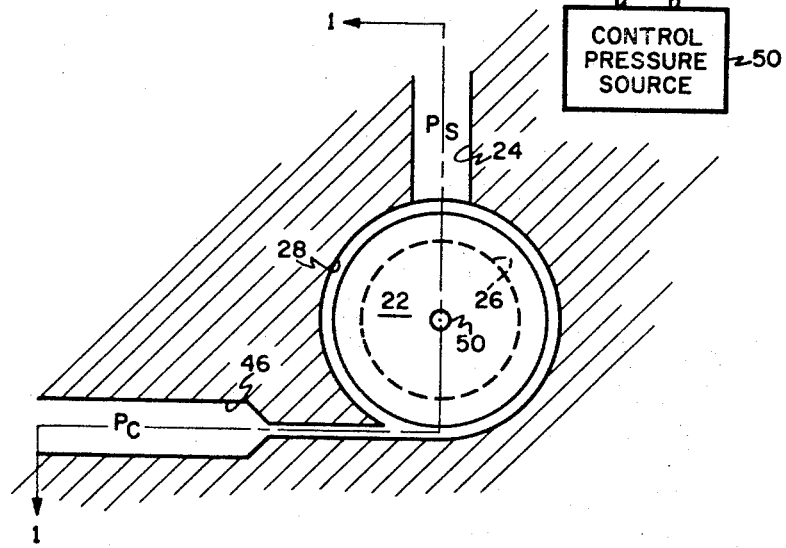
FIGURE 2 is a section taken at 2—2 of FIGURE 1.

The portion of the device of FIGURES 1 and 2 thus described is improved upon by this invention by structure which applies a counterflow in passage 41 and tube 40 which is a fluid flow from left to right in the view of FIGURE 1. In other words, by raising the pressure in tube 40 to approximately that which it is in the center of chamber 30, a pressure is obtained which is slightly higher than the pressure of the fluid from opening 36, resulting in the counterflow.

In the preferred embodiment of FIGURE 1, the pressure to tube 40 is raised to that at the center of chamber 30 by providing a bleed 50 in the center of cylinder 22 which is also the center of chamber 30. Flow from bleed 50 passes through passage 52 in cylinder 22, fluid line 54, valve 56, and passage 41. In this manner, the pressure at the center of chamber 30 is presented at tube 40. Output line 60 is connected to line 58 and passes fluid to a valve 62 which is connected to load 64 by line 66. Output pressure $P_0$ is present in line 66. A valve 68 is attached to vent 44 which affects the pressure $P_4$ in chamber 42.

Satisfactory results have been obtained with the valve 68 opening between $.7D_1$ and $3D_1$, where $D_1$ is the diameter of opening 36, with $1.5D_1$, being typical. Also, valve 56 may have an opening between zero and $D_1$, with a typical opening being $.3D_1$. Valve 56 is very important in obtaining the desired characteristics of this invention and along with valve 68, is adjusted to obtain the desired gain noise level and linear range desired for a particular application. For example, the gain may be increased by opening valve 56. Valve 62 is an impedance matching device which alters the output impedance of the device to match load impedance.

Also, satisfactory results have been obtained with the following dimensional relationships where $D_1$ is the diameter of opening 36, $D_2$ is the inside diameter of tube 40, $D_3$ is the inside diameter of passage 50, S is the distance between the end of tube 40 and the left side of disc 32 while L is the distance between the end of cylinder 22 and the right side of disc 32.

$$S \cong D_1$$
$$D_2 \cong D_1$$
$$D_3 \cong .8 \text{ of } D_1$$
$$L \cong 3.3D_1.$$

Figure 3:
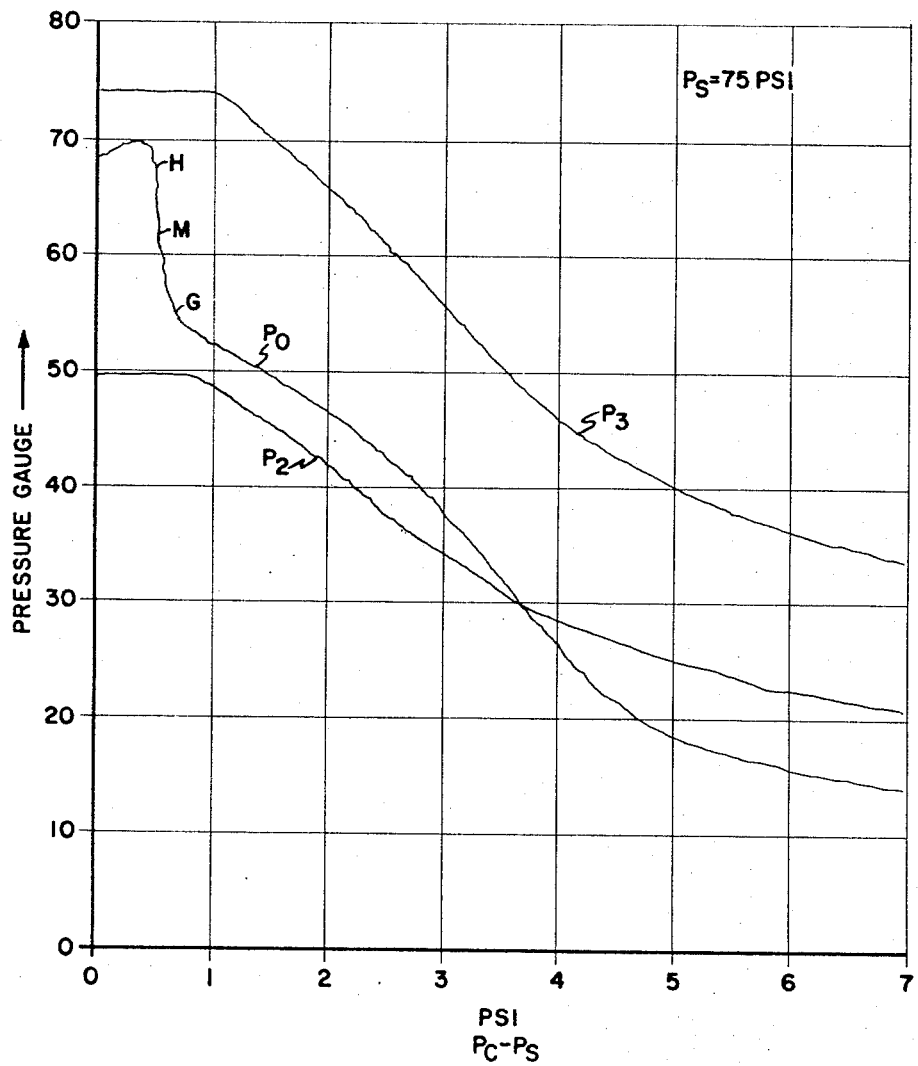
FIGURE 3 is a chart showing the vortex center pressure $P_3$, the output tube pressure $P_2$, and the output pressure $P_0$ vs. the control pressure $P_C$ minus the supply pressure $P_S$ which is provided to supply the vortical flow.

With the device of FIGURE 1, the curves of FIGURE 3 were obtained. With the supply pressure $P_S$ equal to 75 pounds per square inch gauge, the three curves $P_3$, $P_2$ and $P_0$ were obtained. $P_3$ is the pressure in passage 52, $P_2$ is the pressure in passage 41 and $P_0$ is the pressure in line 66. The abscissa of the graph is in pounds per square inch and is the control pressure $P_C$ minus the supply pressure $P_S$. The ordinate of the graph is pressure in pounds per square inch gauge (p.s.i.g.).

Figure 4A:
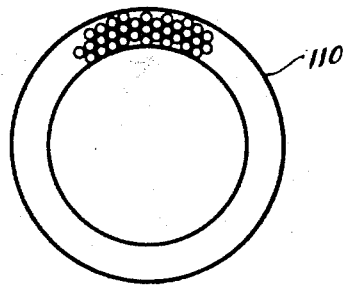
FIGURE 4a is a section partially filled in elevational view of the rotational coupler.
Figure 4:
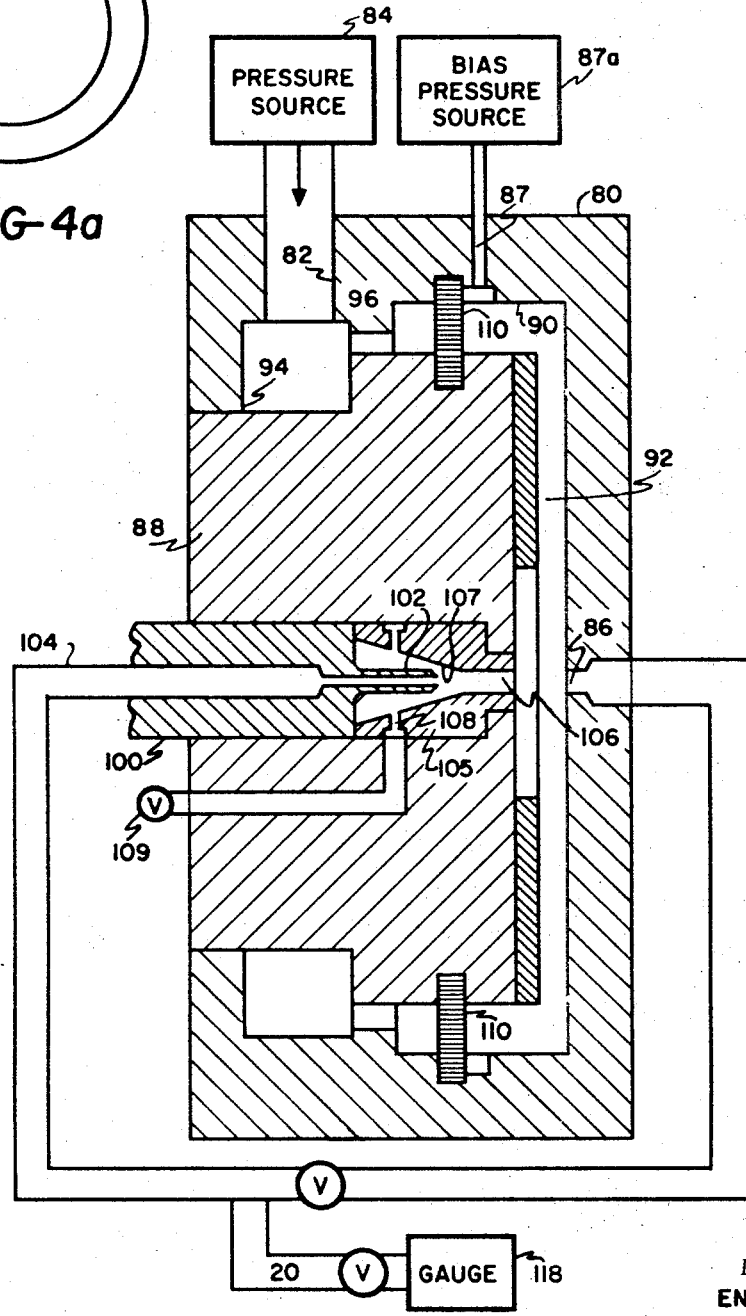
FIGURE 4 is a sectioned view of a partial schematic of a second embodiment of this invention which is adapted as a rotational rate sensor.

As can be seen, the curves $P_2$, $P_3$ and $P_0$ are gradually lower as the control pressure increasingly exceeds the supply pressure. However, it can be seen that output pressure $P_0$ has a very high gain ratio in the area of .5 p.s.i. on the abscissa. This means that for a slight increase in control pressure $P_C$, a very large decrease in output pressure $P_0$ results. Hence, the device is especially suitable for rotational rate sensors where the rotation rate of a member such as tubular element 20 in FIGURE 1 is desired to be detected. (An embodiment specifically designed for rate sensing is shown in FIGURES 4 and 4a and will be later described.) Of course, other applications requiring high gain at low control pressures can be made with the device of this invention.

Changing the supply pressure will result in curves similar to $P_2$, $P_3$, and $P_0$ but with lower supply pressures resulting in curves below those shown in FIGURE 3 and higher supply pressures resulting in curves higher than those shown in FIGURE 3. Also, the vent pressure $P_4$ may be changed by regulating valve 68.

Figure 1A:
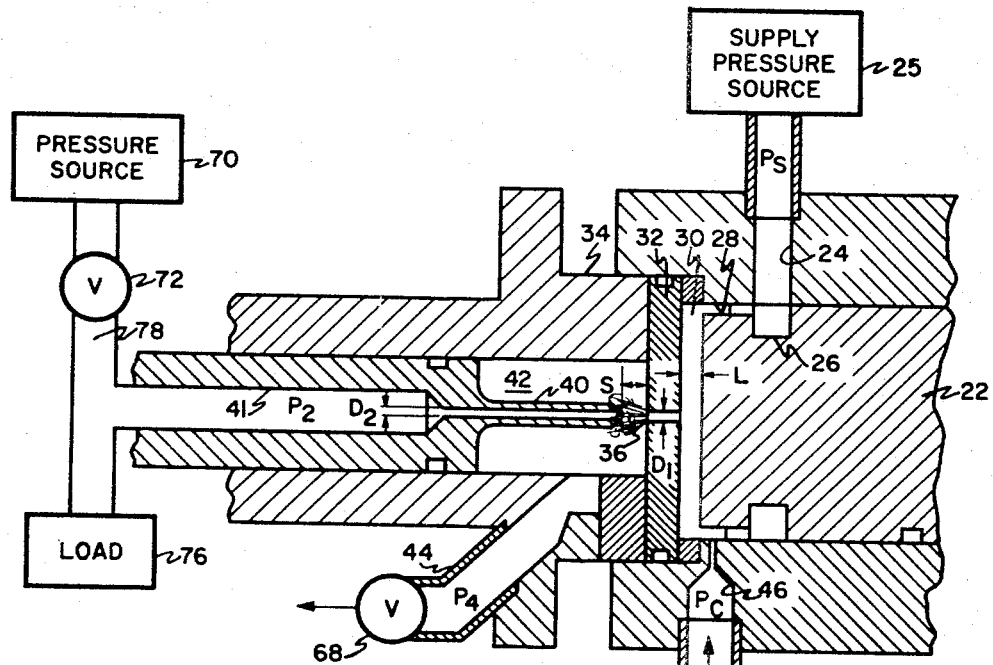
FIGURE 1a is a modification of FIGURE 1 wherein the pressure to provide the counterflow in the output tube is derived from a separate external pressure source.

*Embodiment of FIGURE 1a*

The counterflow in tube 40 may also be applied from a separate external pressure as shown in FIGURE 1a where an external pressure source 70 is connected to a valve 72 which in turn is connected to a passage 41 to supply the added pressure to result in the counterflow. In this embodiment, the load 76 is connected to line 78 and the same results of high gain in low control pressure input are obtained.

*Embodiment of FIGURE 4*

FIGURE 4 shows an embodiment wherein the swirl or the vortical flow is obtained by rotation of the device, with the output varying according to the rotation rate.

An outer cup shaped housing 80 has a port 82 formed therein which is connected to a pressure source 84. A central bleed 86 is formed in the cover face of cup 80. A port 87 admits flow from bias pressure source 87a to establish a zero rate flow approximately at the midpoint M of the high gain portion HG of curve $P_0$ in FIGURE 3. Rotational rate in one direction will cause an output between M and H and rotational rate in the other diretcion will cause an output between M and G.

Cylindrical insert 88 is positioned in cup 80 and spaced therefrom to form annulus 90 and chamber 92. Also, annular space 94 communicates with passage 82 and is formed between cup 80 and insert 88. Annular space 96, also formed between cup 80 and insert 88, provides communication between annulus 94, and the supply pressure $P_S$, and annulus 90.

Positioned in insert 88 is cylinder 100 having annular flange 102 which defines the output pickoff tube. Tube 102 is connected to line 104 which communicates with bleed 86 so that the pressure at the center of chamber 92 is presented in tube 102 causing a counterflow, or flow from left to right, therein. An insert 105 is positioned centrally of cylinder 88 and has opening 106 connected to a flared passage 107. Vent passages 108 are connected through valve 109 to atmosphere.

Annular coupling element 110 is located in annulus 90 and is porous, as shown in FIGURE 4a, so that when housing 80 is rotated, the air in annulus 90 will also be rotated increasing the efficiency of this device when used as a rotational rate sensor.

In the operation of the device shown in FIGURE 4, rotation is applied to housing 80 causing a swirl of air in annulus 90 altering the output of air flow in tube 102 and bleed 86 with this output being read on gauge 118. The greater the rotational rate, the smaller will be the output reading at pressure gauge 118.

Figure 5:
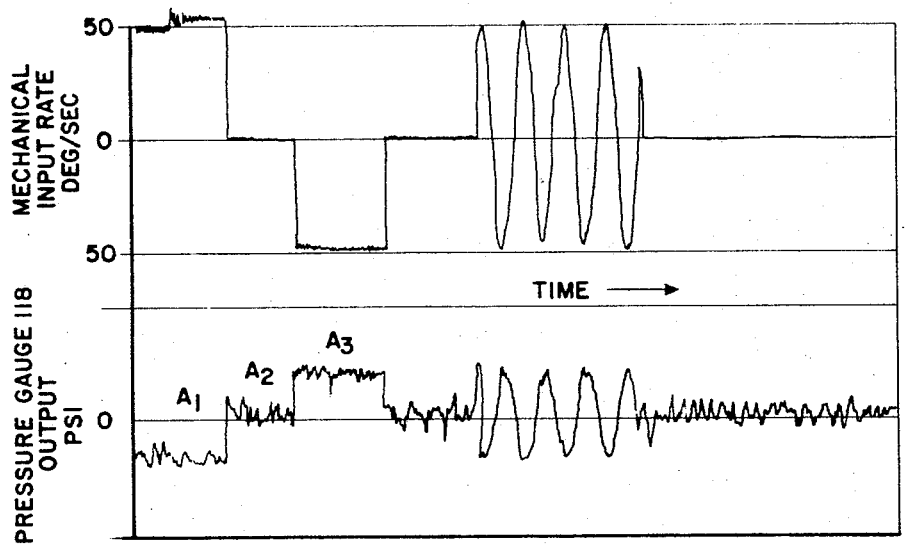
FIGURE 5 is an output curve of a device similar to that shown in FIGURE 4.

The graph of FIGURE 5 shows mechanical input motion and pressure gauge output reading at gauge 118. The input mechanical motion is shown in the upper portion of the graph of FIGURE 5 with the ordinate being in degrees per second and the abscissa being in time. With the device being rotated at 50° per second, a first pressure output $A_1$ of gauge 118 is obtained; at 0° rotation per second, a pressure ouput $A_2$ of gauge 118 is obtained; and at a rotation of minus 50° per second, a third pressure $A_3$ at gauge 118 is obtained. Also, when the rotation rate is continuously changed, as shown by the sine wave curve in the input portion of the graph of FIGURE 5, a corresponding sine wave in p.s.i. of gauge 118 results.

Figure 5A:
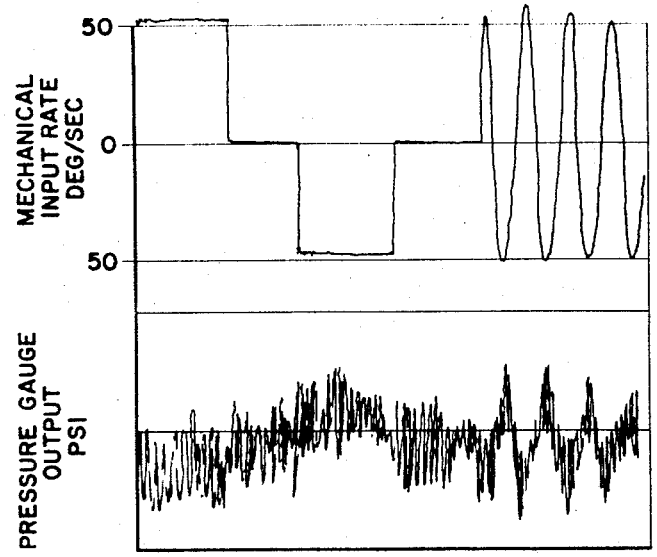
FIGURE 5a is an output curve of a prior art device.

The same mechanical input was applied to a device that did not have the counter flow in tube 102 and the results are recorded in the graph of FIGURE 5a. It is seen that the output p.s.i. has much more noise therein and is much less distinct making it less sensitive and therefore less useful.

It is not definitely known why the device of this invention provides the superior gain shown in FIGURE 3 and the significantly reduced noise shown in FIGURE 5 but it is felt that the counterflow of air in tube 40 of the device of FIGURE 1, and tube 102 of the device of FIGURE 4, tends to stabilize the cone of air that is formed on the output of the opening 36 in FIGURE 1 or in the flare passage 107 of FIGURE 4 thereby minimizing instability, pressure changes, and noise to increase and improve the fluid properties of devices incorporating the teaching of this invention.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:
1. Apparatus comprising
   a housing having a cylindrical chamber therein, a fluid input passage being connected to said chamber to provide a fluid flow into said chamber, fluid control passage for causing the flow from said input passage to experience a vortical flow in said chamber, a fluid output chamber passage being exposed to the center of said cylindrical chamber to receive the discharge of said chamber and provide downstream thereof a diverging rotating flow, a fluid output tube axially aligned with and spaced from the fluid output passage in the path of the discharge flow from said output passage, counterflow means to supply said output tube with a flow counter to the flow in said output passage, load passage means being connected to said counterflow means with the pressure in said load passage means being responsive to the counterflow means pressure and the characteristics of the load means pressure being improved thereby.

2. The apparatus of claim 1 with
said counterflow means comprising an external pressure source being connected to said output tube to supply said counterflow from said fluid output passage.

3. The apparatus of claim 1 with
valve means being connected to said load passage means for adjusting the flow to said load means thereby providing an impedance matching device in said load means passage.

4. The apparatus of claim 1 with
a second chamber for providing an enclosed volume between said fluid output tube and said fluid output passage, vent passage means being positioned in said second chamber, valve means being connected to said vent passage means to provide a controllable pressure in said second chamber.

5. The apparatus of claim 4 with
said valve means having an opening in the range between $.7D_1$ and $3D_1$ where $D_1$ is the output passage diameter.

6. The apparatus of claim 1 with
valve means being connected to said counterflow means upstream from said load means for adjusting the flow in said counter flow means.

7. The apparatus of claim 6 with
said valve means having an opening in the range between zero and $D_1$, where $D_1$ is the output passage diameter.

8. The apparatus of claim 1 with
said counterflow means comprising a central opening to said cylindrical chamber opposite said fluid output passage and said central opening being connected to said fluid output tube to provide said output tube with a pressure that is greater than the pressure from said fluid output passage.

9. The apparatus of claim 8 with
the output passage having a diameter of $D_1$,
the spacing S between the output passage and the output tube being approximately equal to $D_1$,
the inside diameter $D_2$ of the output tube being approximately equal to $D_1$,
the axial length L between the output passage and the central opening being approximately $3.3D_1$,
the inside diameter $D_3$ of the central opening being approximately equal to $.8D_1$.

10. The apparatus of claim 8 with
the output passage having a diameter of $D_1$,
the spacing S between the output passage and the output tube being approximately equal to $D_1$.

11. The apparatus of claim 8 with
the output passage having a diameter of $D_1$,
the inside diameter $D_2$ of the output tube being approximately equal to $D_1$.

References Cited

UNITED STATES PATENTS

| | | | |
|---|---|---|---|
| 3,181,546 | 5/1965 | Boothe | 137—81.5 |
| 3,207,168 | 9/1965 | Warren | 137—81.5 |
| 3,219,048 | 11/1965 | Palmisano | 137—81.5 |
| 3,256,899 | 6/1966 | Dexter et al. | 137—81.5 |
| 3,267,946 | 8/1966 | Adams et al. | 137—81.5 |
| 3,272,215 | 9/1966 | Bjornsen et al. | 137—81.5 |
| 3,290,947 | 12/1966 | Reilly | 137—81.5 XR |
| 3,324,891 | 6/1967 | Rhoades | 137—81.5 XR |
| 3,336,931 | 8/1967 | Fox et al. | 137—81.5 |

SAMUEL SCOTT, *Primary Examiner.*